United States Patent [19]

Shikler

[11] Patent Number: 5,265,960
[45] Date of Patent: Nov. 30, 1993

[54] COLLAPSIBLE REUSABLE BAG WITH INTEGRAL HANDLES

[75] Inventor: Arie Shikler, Sherman Oaks, Calif.
[73] Assignee: Auto-Shade, Inc., Moorpark, Calif.
[21] Appl. No.: 959,749
[22] Filed: Oct. 13, 1992
[51] Int. Cl.[5] .......................... B65D 33/08
[52] U.S. Cl. ........................ 383/15; 383/92; 383/95; 383/110
[58] Field of Search .............. 383/15, 92, 95, 110

[56] References Cited

U.S. PATENT DOCUMENTS

| | | | |
|---|---|---|---|
| 2,319,127 | 5/1943 | Guenther et al. | 383/15 |
| 4,079,767 | 3/1978 | Howard | 383/95 |
| 4,211,091 | 7/1980 | Campbell | 383/95 |

FOREIGN PATENT DOCUMENTS

| | | | |
|---|---|---|---|
| 789019 | 10/1935 | France | 383/15 |
| 1513787 | 2/1968 | France | 383/15 |
| 454113 | 9/1936 | United Kingdom | 383/92 |
| 2210018 | 1/1989 | United Kingdom | 383/95 |

Primary Examiner—Stephen P. Garbe
Attorney, Agent, or Firm—Blakely, Sokoloff, Taylor & Zafman

[57] ABSTRACT

A reusable lunch bag with a pair of handles that are adapted to secure the bag in a closed position. The bag has a front wall that is separated from a back wall by a pair of side walls. The front, back and side walls are attached to a bottom wall. The walls define a cavity within the bag. The side walls and bottom wall are adapted to be collapsed so that the bag can be pressed into a flat position. The bag is typically constructed from a foam that is encapsulated by vinyl material, which together create a thermal barrier. The lunch bag also has a first handle that extends from the front wall and a second handle that extends from the back wall. The second handle has a flap which wraps around the outer surface of the first handle, so that the flap is adjacent to the outer surface of the second handle. The inner surface of the flap and the outer surface of the second handle have hook and loop material which secure the handle and bag in a closed position.

1 Claim, 1 Drawing Sheet

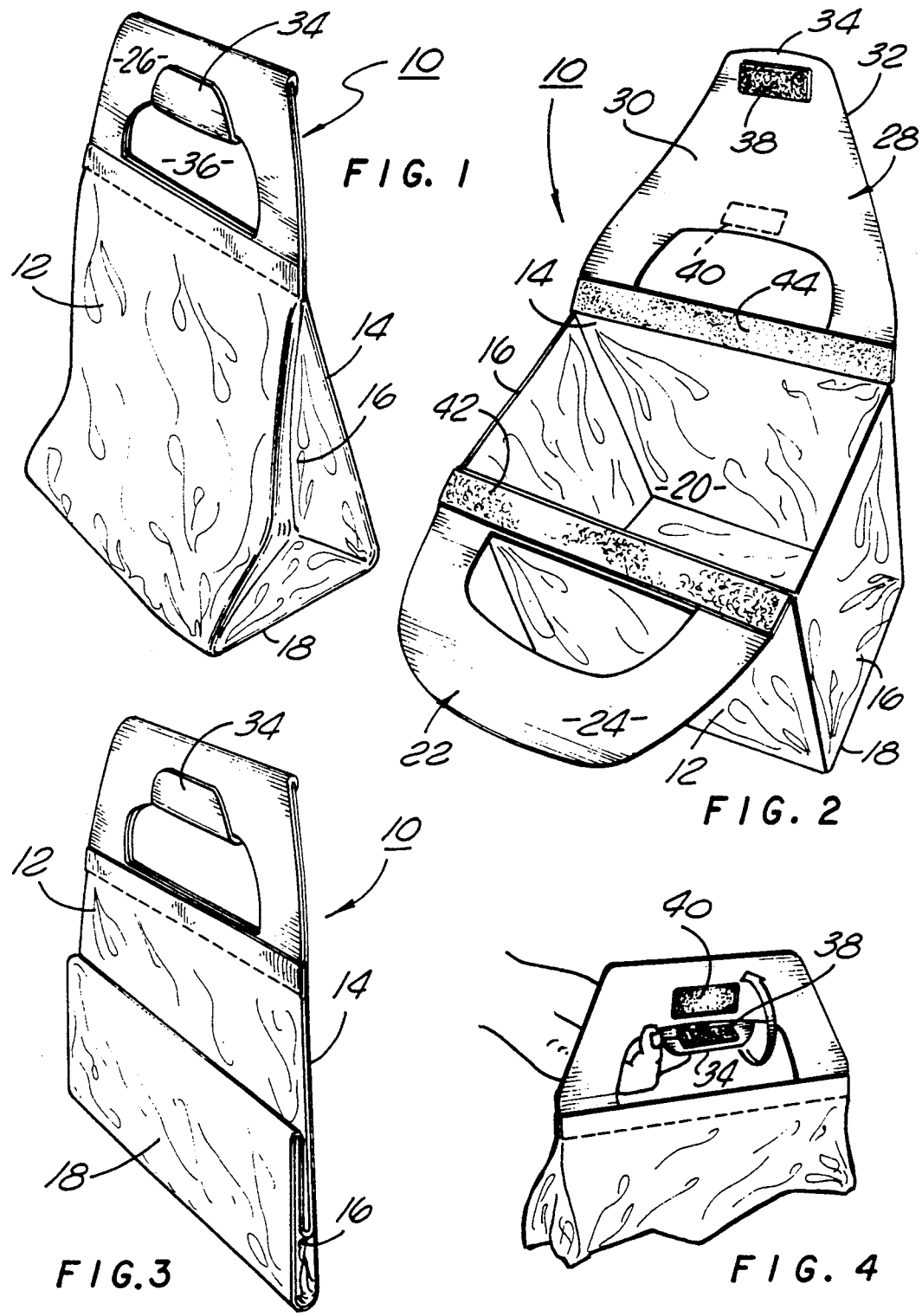

COLLAPSIBLE REUSABLE BAG WITH INTEGRAL HANDLES

BACKGROUND OF THE INVENTION

1. Field of the Invention

The present invention relates to a reusable lunch bag.

2. Description of Related Art

Food items are frequently carried in paper lunch bags. The lunch bags are typically packaged in a flat position and expanded when filled with food items. The top of the bag is usually rolled or folded to seal the contents of the bag and provide a means to more readily grab the paper. Because of the physical characteristics of paper, the folded portion tends to relax toward an open position so that the contents of the bag are not completely sealed. The paper construction of the bag is also conducive to damage when folded and used to carry food items. For this reason, the bags are typically discarded after a single use. Such a procedure can result in a continuous cycle of purchasing new bags, which can be costly if done over an extended period of time. Additionally, paper lunch bags are relatively poor thermal insulators, such that enclosed food items can become warm and even spoiled if exposed to a hot environment.

Food items are sometimes stored in a metal lunch box. Although lunch boxes are reusable and are typically provided with an easy to carry handle, the boxes are usually bulky to carry and difficult to store. Additionally, metal is a poor thermal insulator and is relatively expensive to produce. It would therefore be desirable to have a reusable insulated container that can store food items and allow the user to easily carry and seal the contents of the container.

SUMMARY OF THE INVENTION

The present invention is a reusable lunch bag with a pair of handles that are adapted to secure the bag in a closed position. The bag has a front wall that is separated from a back wall by a pair of side walls. The front, back and side walls are attached to a bottom wall. The walls define a cavity within the bag. The side walls and bottom wall are adapted to be collapsed so that the bag can be pressed into a flat position. The bag is typically constructed from a foam that is encapsulated by vinyl material, which together create a thermal barrier. The vinyl/foam walls provide an insulated bag that can be collapsed and used over and over again.

The lunch bag also has a first handle that extends from the front wall and a second handle that extends from the back wall. The second handle has a flap which wraps around the outer surface of the first handle, so that the flap is adjacent to the outer surface of the second handle. The inner surface of the flap and the outer surface of the second handle have hook and loop material which secure the handle and bag in a closed position. The front and back walls of the bag may also have hook an loop material which further seal the contents of the bag.

Therefore it is an object of the present invention to provide a reusable insulated lunch bag that can be collapsed into a flat position.

It is also an object of the present invention to provide a reusable lunch bag that has a pair of handles adapted to secure the bag into a closed position.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a perspective view of a lunch bag of the present invention;

FIG. 2 is a top view of the lunch bag shown in an open position;

FIG. 3 is a perspective view of the lunch bag pressed into a flat position.

FIG. 4 is a perspective view of the lunch bag with a flap being wrapped around a pair of handles.

DETAILED DESCRIPTION OF THE INVENTION

Referring to the drawings more particularly by reference numbers, FIGS. 1 and 2 show a lunch bag 10 of the present invention. The bag 10 includes a front wall 12 that is separated from a back wall 14 by a pair of side walls 16. The front 12, back 14 and side 16 walls are all attached to a bottom wall 18. The walls 12–18 define a cavity 20 which is preferably large enough to store a number of food items. In the preferred embodiment, the bag 10 is approximately 9 inches by 8 inches by 5 inches. Although the present invention is described as being used to store and carry food items, it is to be understood that the bag 10 can be used to hold other items.

As shown in FIG. 3, the bag 10 is preferably constructed so that the side walls 16 and bottom wall 18 can be collapsed into a flat position. The walls 16 and 18 preferably collapse in an accordion-like fashion. Such a construction allows the user to more easily store the bag 10 when the device 10 does not contain food items.

The walls 12–18 are preferably constructed from a foam material that is encapsulated by two layers of vinyl. The foam/vinyl walls are collapsible and provide insulation for the items contained within the cavity 20 of the bag 10. The vinyl is also resilient enough so that the bag 10 can be used over and over again. Additionally, the vinyl is easy to clean and provides a favorable surface for printing logos or other information on the bag 10.

Extending from the front wall 12 is a first handle 22 which has an inner surface 24 and an outer surface 26. The bag 10 also has a second handle 28 extending from the back wall 14. The second handle 28 has an inner surface 30 and an outer surface 32. The handles 22 and 28 are preferably constructed from strips of cardboard that are encapsulated by vinyl. Foam may also be placed between the cardboard and vinyl to increase the softness of the handles.

As shown in FIG. 4, the second handle 28 has a flap 34 that can be wrapped around the outer surface 26 of the first handle 22 and through the space 36 between the handles and bag, so that the inner surface 30 of the flap 34 is adjacent to the outer surface 32 of the second handle 28. The inner surface 30 of the flap 34 has a strip of loop material 38 which mates with a strip of hook material 40 attached to the outer surface 26 of the second handle 32. The hook and loop material secure the handles and bag 10 in a closed position.

A strip of loop material 42 may attached to a top inner portion of the front wall 12. The loop material 42 mates with a strip of hook material 44 located at the top inner portion of the back wall 14. The strips of hook 44 and loop 42 material seals the cavity 20 and the contents of the bag 10. What is thus provided is a lunch bag, that is insulated, reusable, and can be folded into a flat position. The bag also has integral handles which can be easily carried and secure the bag in a closed position.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus, comprising:

a bag having a front wall separated from a back wall by a pair of side walls, said front, back and side walls being connected to a bottom wall which together define a cavity, said bottom and side walls being constructed to collapse such that said bag is in a flat position, said bag containing a layer of insulating foam material that is encapsulated by a pair of vinyl layers;

a first strip of loop material attached to an inner top surface of said front wall;

a first strip of hook material attached to an inner top surface of said back wall, said first hook material being adapted to mate with said first loop material to attach said front wall to said back wall;

a first handle extending from said front wall, said first handle having an inner surface and an outer surface;

a second handle extending from said back wall, said second handle having an inner surface and an outer surface, said second handle further having a flap that is adapted to wrap around said outer surface of said first handle such that said flap is adjacent to said outer surface of said second handle;

a second strip of loop material attached to said flap; and, a second strip of hook material attached to said outer surface of said second handle, said second hook material being adapted to mate with said second loop material to attach said flap to said outer surface of said second handle.

* * * * *